US008195347B2

(12) United States Patent
Boorman

(10) Patent No.: US 8,195,347 B2
(45) Date of Patent: Jun. 5, 2012

(54) METHOD AND SYSTEM FOR APPROACH DECISION DISPLAY

(75) Inventor: Daniel J. Boorman, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 12/474,122

(22) Filed: May 28, 2009

(65) Prior Publication Data

US 2010/0305786 A1 Dec. 2, 2010

(51) Int. Cl.
*G01C 23/00* (2006.01)

(52) U.S. Cl. ............................................ 701/16; 701/14

(58) Field of Classification Search .................... 701/16, 701/1, 3, 14, 208, 15, 29, 82, 11, 5, 9, 400; 340/945, 951, 977, 973, 974; 342/33
See application file for complete search history.

(56) References Cited

U.S. PATENT DOCUMENTS

| | | | | |
|---|---|---|---|---|
| 7,188,007 | B2 | 3/2007 | Boorman et al. | |
| 7,436,323 | B2 * | 10/2008 | Ishihara et al. | 340/951 |
| 7,460,029 | B2 | 12/2008 | Boorman et al. | |
| 2008/0091311 | A1 | 4/2008 | Boorman et al. | |
| 2008/0103641 | A1 | 5/2008 | Ratcliffe | |
| 2008/0195309 | A1 * | 8/2008 | Prinzel, III et al. | 701/208 |
| 2009/0125168 | A1 * | 5/2009 | Voisin | 701/15 |
| 2010/0168939 | A1 * | 7/2010 | Doeppner et al. | 701/16 |
| 2010/0299040 | A1 * | 11/2010 | Rado | 701/82 |

FOREIGN PATENT DOCUMENTS

| | | | |
|---|---|---|---|
| EP | 1988365 | A2 | 5/2008 |
| EP | 2048477 | A2 | 4/2009 |
| WO | 2006115873 | A2 | 2/2006 |
| WO | 2008130948 | A1 | 10/2008 |

OTHER PUBLICATIONS

European Search Report for Application No. EP10155282.6, dated Sep. 17, 2010, 9 pages.

FAA, Advisory Circular AC 120-28D—Criteria for Approval of Category III Weather Minima for Takeoff, Landing and Rollout; Section 4.3, Operational Concepts: Landing.

FAA, Advisory Circular AC 120-28D—Criteria for Approval of Category III Weather Minima for Takeoff, Landing and Rollout; Appendix 1—Definitions and Acronyms.

National Aeronautical Charting Office (NACO)—Terminal Procedures Publication (d-TPP) / Airport Diagrams: Seattle-Tacoma ILS or LOC RWY 16L.

National Aeronautical Charting Office (NACO)—Terminal Procedures Publication (d-TPP) / Airport Diagrams: Seattle-Tacoma ILS RWY 16L (CAT II).

National Aeronautical Charting Office (NACO)—Terminal Procedures Publication (d-TPP) / Airport Diagrams: Seattle-Tacoma ILS RWY 16L (CAT III).

National Aeronautical Charting Office (NACO)—Terminal Procedures Publication (d-TPP) / Airport Diagrams: Seattle-Tacoma RNAV (GPS) RWY 16L.

(Continued)

*Primary Examiner* — Thomas G. Black
*Assistant Examiner* — Marthe Marc-Coleman
(74) *Attorney, Agent, or Firm* — The Boeing Company; Brook Assefa

(57) ABSTRACT

Approach Decision Display and associated methods and systems are disclosed. A method and system in accordance to one embodiment of the disclosure includes a display of operationally-relevant information for final approach and landing on a cockpit graphical display. Approach Decision Display System (ADDS) provides, in a graphical display, dynamic decision parameters as a function of the health of required equipment for the selected approach and the aircraft's ability to execute the approach and landing.

28 Claims, 7 Drawing Sheets

OTHER PUBLICATIONS

FAA, Advisory Circular AC 120-28D—Criteria for Approval of Category III Weather Minima for Takeoff, Landing and Rollout; Section 4.3, Operational Concepts: Landing, pp. 1-103; Jul. 13, 1999.

FAA, Advisory Circular AC 120-28D—Criteria for Approval of Category III Weather Minima for Takeoff, Landing and Rollout; Appendix 1—Definitions and Acronyms, pp. 1-103; Jul. 13, 1999.

* cited by examiner

METHOD AND SYSTEM FOR APPROACH DECISION DISPLAY

TECHNICAL FIELD

Aspects of the present disclosure are directed to display of information necessary for cockpit flight crew approach decision and associated systems and methods.

BACKGROUND

Commanders and pilots of vehicles such as aircraft have the task of not only managing the complex systems of the aircraft but also operating the aircraft in a safe and efficient manner. In this regard, cockpit flight crews such as pilots are presented with myriad of information that they must manage, interpret, and ultimately utilize in making their decisions and executing their tasks based on those decisions. The required decision-making proficiency generally involves specialized training and qualifications that vary as a function of aircraft type, the capability level of the aircraft's systems and equipment, the route, the airport, and even the approved approach procedure for a particular airport under certain conditions. This is especially the case for critical phases of flight when such decisions may be made in a matter of seconds.

The final approach phase is one of the most critical and highest workload of flight phases. When executing a final approach and landing, pilots have to manage various types of information to make the landing decision and ultimately land the aircraft. For example, one type of information, typically provided on paper such as Jeppesen approach charts, may be related to the airport's runway, the approach attributes such as approach minima, and visibility requirements for deciding to land the aircraft or aborting the landing. Thus, pilots have to retain or be able to quickly recall this information as they are executing the final approach and landing.

Furthermore, to fly an approach using an aircraft with modern complex systems and equipment, pilots must find, interpret, and sometimes cross-check information from multiple sources. In this regard, among decision variables that pilots have to keep track of are the states of the aircraft's systems and equipment needed for the type of landing that the crew is executing. For example, in certain modern jet aircraft such as a Boeing 777, if the autopilot is commanded not only to fly the aircraft to the runway but also to land the aircraft in low visibility conditions, all three of the autopilot systems have to be operational. If only two are operational, then the autopilot can take the aircraft to an approved approach minima above ground for the particular approach where the pilot must acquire the runway environment visually to continue the automatic landing, or otherwise execute a missed approach. Thus, pilots have to monitor the aircraft's systems, understand the systems' status information reported to them, cross-check the status information reported from various systems and information sources, and make sure that, ultimately, their decisions are consistent with the aircraft's systems' health and capabilities.

The flight crew's task of monitoring the aircraft's systems involves managing, displaying, and supervising various systems such as navigation radios, flight management computers, flight control computers, datalink systems, and display systems. Often, the information is displayed at various locations in the aircraft such as Primary Flight Displays (PFD), Navigation Displays (ND), Mode Control Panels (MCP), Control Display Units (CDU), and Crew Alerting Displays, as well as in printed form such as Jeppesen's approach charts (Note: Jeppesen is a trademark of Jeppesen Sanderson, Inc. in the United States, other countries, or both). In addition, further information may be found in the Airplane's Flight Manual (AFM) and the airplane's Flight Crew Operation Manual (FCOM).

The need to monitor and utilize these different information sources and the information therein contributes to a heavy workload, and potentially to errors. Pilots have to accomplish substantial planning tasks, management tasks, and more importantly the integration task of pulling together system information to come up with operationally-relevant information necessary for the decision to land the aircraft or to abort the landing. These tasks are especially demanding when, for example, there is an equipment failure during final approach whereby the landing performance capability of the aircraft degrades and pilots have to interpret the equipment failure in terms of its impact on continued execution of the landing.

Such degradation can be due to equipment failure onboard the aircraft, for example, involving navigation or autopilot systems, or off board the aircraft, for example involving signal degradation or loss pertaining to a navigation or landing aid system such as Global Positioning System (GPS) or an Instrument Landing System (ILS). In either case, in a matter of seconds, the pilot must recognize the failure and its impact on landing performance capability and make the critical decision involving (1) whether or not continue the landing and, if so (2) whether to take over and hand-fly to touchdown or to continue an automatic landing.

Thus, there is a need for a tool that simplifies the flight crew's critical decisions during the approach phase of flight by providing well-integrated and operationally-relevant information without the need to find and monitor such information that is currently provided by paper charts and by various systems at multiple locations in the flight deck.

SUMMARY

One way of meeting this need is by an approach decision tool that helps pilots quickly assess the state of the aircraft's systems and the airport's navigation and landing equipment, as well as their capability with respect to the operational task of executing a landing for the selected approach.

The present disclosure addresses this need via an Approach Decision Display System (ADDS) and interactive formats to support it. The ADDS integrates and transforms previously scattered information into a graphical depiction displayed in a cockpit graphical display system. The ADDS is able to display all operationally-relevant information in a single location of choice in the flight deck, including a suitable forward-view location for the pilot and copilot. Thus, in lieu of monitoring and interpreting different information provided on the PFDs, CDUs, and MCPs, pilots can look to one system—the ADDS—and understand the status of the approach, thereby quickly recognizing errors or faults that may affect the viability of the approach.

Moreover, the ADDS' graphical depiction of operationally-relevant information accounts for the relationships the various types of information have with each other and to the overall approach procedure in order to make the display more meaningful to the pilots. In this regard, the ADDS displays information that supports key final approach decisions such as (1) whether or not continue the landing but also on (2) whether to take over and hand-fly to touchdown or to continue an automatic landing. The graphical depiction includes reinforcement of important status information such as autoland status and, ultimately, whether the flight is cleared for landing or not, thus reducing pilot workload and the potential for errors.

Operationally-relevant information available on the ADDS includes: the name of the selected approach and approach type from the active flight plan; approach minima such as decision height and decision altitude; customized approach minima alerts; graphical representation of radio altitude; missed approach altitude (MA); autoland status; cleared-to-land status; visibility parameters such as required flight visibility (VIS) and runway visual range (RVR), thrust status and thrust retard capability for flare; autopilot disconnect altitude for the NO-AUTOLAND case; graphical indication of the airplane in go-around mode; and approach-reference distance.

In addition, interactive input capability of the ADDS includes selections for: level of available function(s) for systems and equipment providing approach-relevant information; minimum height for the selected approach; missed-approach altitude (MA); ability to select or change the approach; and ability to select autopilot disconnect height in the event of a non-autoland approach.

A preferred system for displaying operationally-relevant information to cockpit flight crew comprises an Approach Decision Display System (ADDS); a Flight Management System (FMS) operatively connected to said ADDS; a cockpit graphical display system operatively connected to said ADDS; an aircraft control system operatively connected to said ADDS; a communications system operatively connected to said ADDS; a navigation system operatively connected to said ADDS; a control input device operatively connected to said ADDS; and graphical display of operationally-relevant information displayed on said cockpit graphical display system, including locations in the forward field of view, wherein said operationally-relevant information are transformed into a graphical depiction of an airplane's landing performance capability.

In accordance with an aspect of this disclosure, the ADDS displays the own-ship symbol, depicting the location of the own-ship relative to quasi-static referents comprising at least one of a ground level indicator, a runway indicator, a touchdown zone elevation tag, an approach path indicator, a missed approach altitude tag, a required visibility tag, a runway visual range tag, a thrust retard capability indicator, and an autopilot disconnect cue, a ground-level indicator, an Approach Path indicator, and an approach-reference distance indicator.

In accordance with another aspect of this disclosure, the ADD displays the own-ship symbol, depicting the location of the own-ship relative to dynamic referents comprising at least one of an own-ship symbol, an approach minima tag, an approach minima indicator, an approach minima alert tag, an approach minima alert indicator, a radio altitude tag, a radio altitude indicator, an approach-reference distance tag, an actual runway visual range tag, and a missed approach point symbol.

In accordance with yet another aspect of this disclosure, the ADD displays the own-ship symbol, the static referents, the dynamic referents, and status referents comprising at least one of an approach name, a landing clearance status tag, and an autoland status tag wherein said quasi-static, said dynamic, and said status referents are transformed into a graphical depiction of an airplane's landing performance capability.

It should be appreciated that this Summary is provided to introduce selected aspects of the disclosure in a simplified form that are further described below in the Detailed Description. This Summary is not intended to be used to limit the scope of the claimed subject matter. Other aspects and features of the present invention, as defined solely by the claims, will become apparent to those ordinarily skilled in the art upon review of the following non-limited detailed description of the invention in conjunction with the accompanying figures.

DETAILED DESCRIPTION

Figure 1:
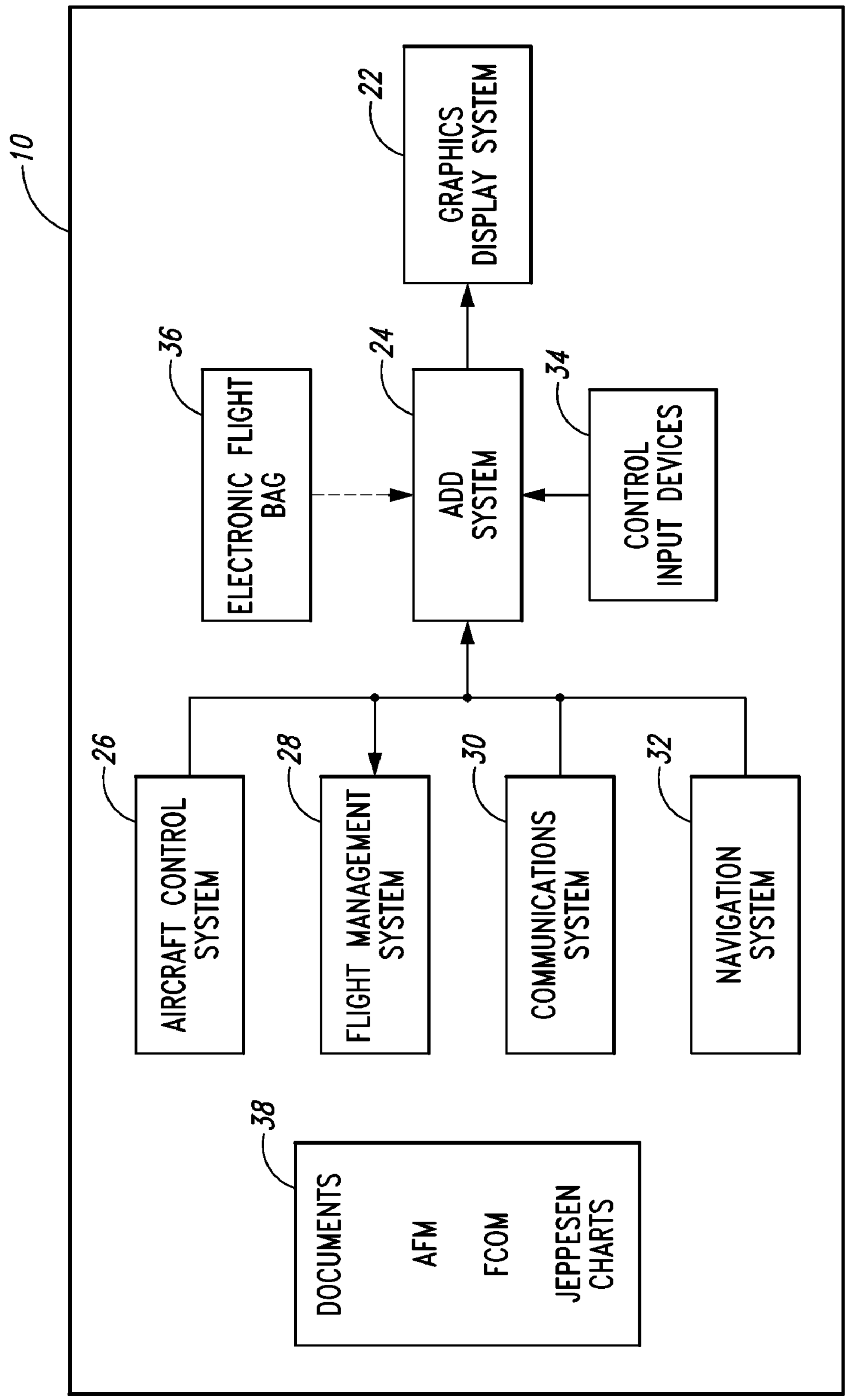
FIG. 1 is a schematic diagram of an advantageous embodiment of the systems' components according to the disclosure.

Commanders and pilots of vehicles such as aircraft have the task of not only managing the complex systems of the aircraft but also operating the aircraft in a safe and efficient manner. In this regard, cockpit flight crews such as pilots are presented with myriad of information that they must manage, interpret in context with the task at hand, and ultimately utilize in making their decisions and executing their tasks based on those decisions. For example, pilots may have to consult navigation or approach charts and apply the relevant information on those charts to their aircraft in executing a task. In applying such information to their airplane, they may also have to be aware of the current system and equipment capability of their aircraft, account for actual systems failures, and utilize the information consistent with the current aircraft systems' capability. In addition, for certain phases of flight such as final approach and landing, they must also be cognizant of off-board navigation or landing aid equipment such as GPS satellite signal degradation or Instrument Landing System (ILS) failures that may impact the approach and landing. Thus pilots have to keep track of myriad of information, filter the information for what may affect the continued execution of the planned phase of flight, garner a complete picture of the execution challenge, and make a decision regarding the airplane's capability to execute the required performance for the challenge at hand.

This type of decision-making proficiency generally involves specialized training and qualifications that vary as a function of aircraft type, the capability level of the aircraft's systems and equipment, the route, the airport, and even the approved approach procedure for a particular airport under certain conditions. This is especially the case for critical phases of flight when such decisions may be made in a matter of seconds.

The final approach phase is one of the most critical and highest workload of flight phases. When executing a final approach and landing, pilots have to manage various types of information to make the landing decision and ultimately land the aircraft. For example, one type of information, typically provided on paper charts such as Jeppesen approach charts, may be related to the airport's runway, the Runway Visual Range (RVR), the Missed Approach (MA) altitude, and the approach attributes such as approach altitude minima for deciding to land the aircraft or aborting the landing. Thus, pilots have to review the information prior to entering the final approach phase of the flight and be able to quickly recall the information as they are executing the final approach and landing.

Furthermore, to fly an approach using an aircraft with modern complex systems and equipment, pilots must find, interpret, and sometimes cross-check information from multiple sources. In this regard, among decision variables that pilots have to keep track of are the states of the aircraft's systems and equipment needed for the type of landing that the crew is executing. For example, in certain modern jet aircraft such as a Boeing 777, if the autopilot is commanded not only to fly the aircraft to the runway but also to land the aircraft in conditions of low visibility and low cloud ceiling, all three of the autoland systems have to be operational. If only two are operational, then the autopilot can take the aircraft to an approved approach minimum above ground for the particular approach where the pilot must acquire the runway environment visually to continue the automatic landing, or otherwise execute a missed approach.

In addition to understanding the effect of the performance degradation of systems such as the autopilot, pilots must also understand the impact of such systems degradations to the approach procedure they are executing. For example, if as in the above example the autoland system degrades, the pilot may decide to abort the landing or may execute the landing consistent with a different approved final approach procedure for the same runway. The different procedure may involve, for example, a different approach minimum and a different RVR. Thus, pilots have to monitor the aircraft's systems, understand the systems' status information reported to them, cross-check the status information reported from various systems and information sources, and make sure that, ultimately, their decisions are consistent with not only the aircraft's systems' capabilities but also with the approved approach procedure for the selected runway.

In this regard, the flight crew's tasks with respect to the aircraft's systems involves managing, displaying, and supervising various systems such as navigation radios, flight management computers, flight control computers, communications datalink systems, and display systems. Often, the information is displayed at various locations in the aircraft such as Mode Control Panels (MCP), Autoland Status Annunciators (ASA), Control Display Units (CDU), Primary Flight Displays (PFD), and crew alerting displays, as well as printed matter such as Jeppesen's approach charts. More detailed information may also be found in the Airplane's Flight Manual (AFM), and the airplane's Flight Crew Operation Manual (FCOM).

The task of pulling together such information to come up with operationally-relevant and decision-critical information necessary for the decision to land the aircraft or to abort the landing is a challenging one. The need to work with multiple systems and different information sources during final approach contributes to a heavy workload, high stress, and potentially to errors. This task is especially demanding when, for example, there is an equipment failure during final approach whereby the landing performance capability of the aircraft—that is, the capability of executing automatic or autopilot-based approach and landing—degrades and pilots have to interpret the equipment failure in terms of its impact on continued execution of the approach and landing.

Thus, there is a need for a tool that simplifies the flight crew's critical decisions during the approach phase of flight by providing well-integrated and operationally-relevant information without the need to find and monitor such information that is currently provided by paper charts and by various systems at multiple locations in the flight deck, or not provided at all.

The present disclosure addressed this need by providing a method and system that provides operationally-relevant and decision-critical information for final approach and landing on a graphical display without the need to interpret system information. The Approach Decision Display System (ADDS) provides, in a graphical display, dynamic decision parameters as a function of the health of required equipment for the selected approach and the aircraft's ability to execute the approach and landing.

Figure 2:
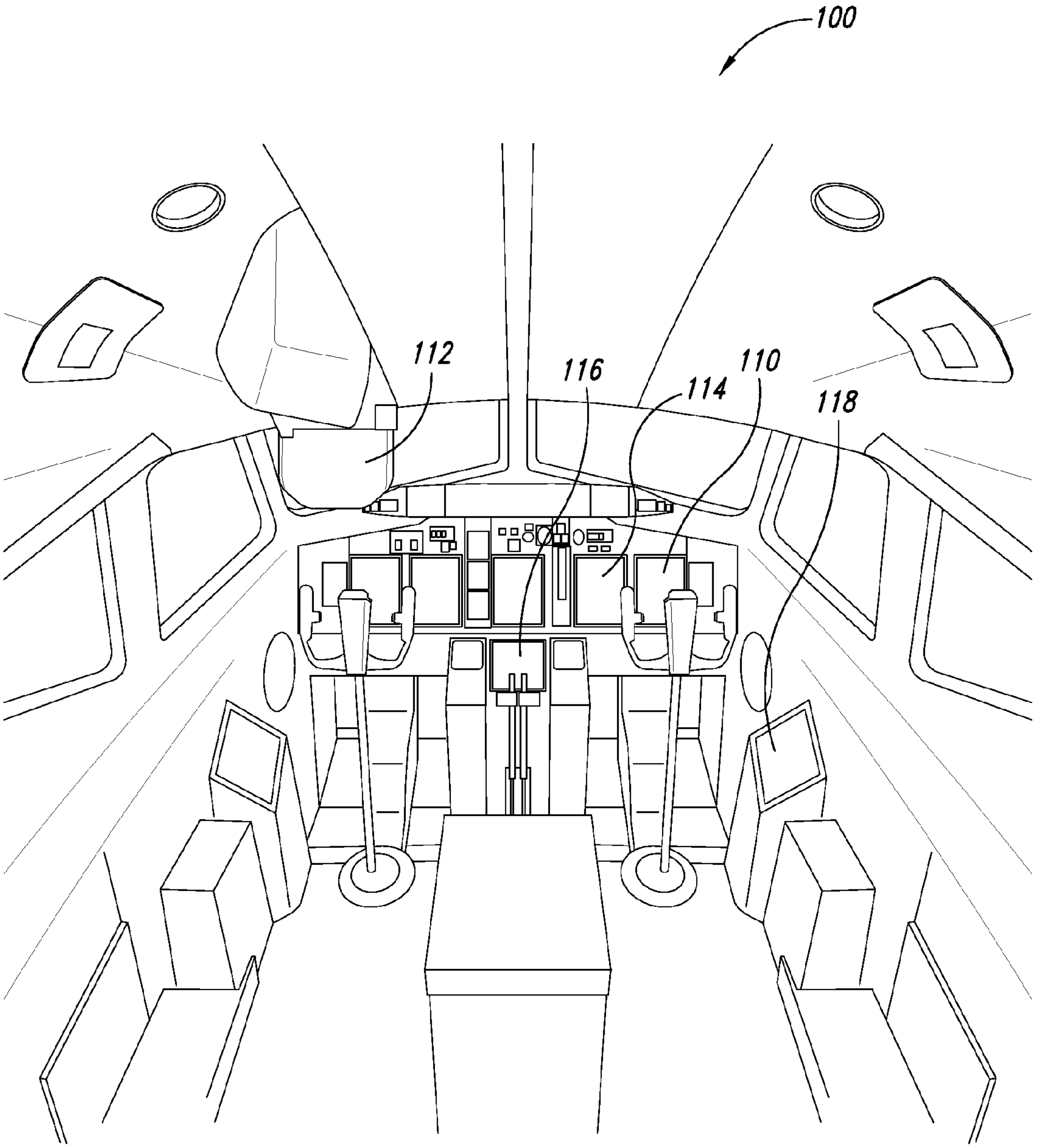
FIG. 2 represents several possible display locations for an advantageous embodiment of the disclosure.

FIG. 1 depicts an embodiment of an aircraft systems architecture 10 centered on a system for an Approach Decision Display System (ADDS) 24. FIG. 1 has been simplified in order to make it easier to understand the present disclosure. Those skilled in the art will appreciate that FIG. 1 is one configuration of many that can be implemented for an embodiment of an ADDS 24. For example, and without limitation, the ADDS 24 can be hosted on a number of on-board computers suitable for the airplane configuration at hand such as a dedicated ADDS computer (not shown), a Flight Management System (FMS) 28, or a cockpit graphical display system 22, which typically comprises at least a graphics display computer (not shown) and a graphics display (not shown). In various embodiments, as shown in FIG. 2, an aircraft cockpit 100 and the airplane's cockpit graphical display system 22 may include at least one of a Primary Fight Display (PFD) 110, a Heads-Up Display (HUD) 112, a Navigation Display (ND) 114, a Multi-Function Display (MFD) 116, an Electronic Flight Bag (EFB) display 118, or other displays in the flight deck.

Referring to FIG. 1, an ADDS 24 is provided to receive approach-relevant information from other aircraft systems. Approach-relevant information is any information that is relevant to understanding, planning, and executing a final approach and landing procedure. From the available approach-relevant information, the ADDS 24 extracts operationally-relevant and decision-critical information (hereafter called operationally-relevant for readability purposes) for display to the pilots. In this regard, the Aircraft Control Systems 26 (components of the aircraft flight control system not shown) provides approach-relevant information such as the performance and health of the redundant autoland and autopilot systems, status of the Thrust Management Computer (TMC), and selected flight control inputs on the Mode Control Panel (MCP). The Flight Management System (FMS) 28 and its Navigation Database (NDB) (not shown) provide approach-relevant information such as the name of the selected approach and certain decision parameters for the selected approach. The Communications System 30 may also be enabled to provide status information such as actual (measured) RVR, and whether the airplane has been cleared to land. Other approach-relevant information may be provided by the Navigation System 32 whose components such as the Global Positioning System (GPS), GPS Landing System (GLS), Instrument Landing System (ILS), Distance Measuring Equipment (DME), and Air Data and Inertial Reference Unit (ADIRU) provide approach-relevant information such as the performance and health of GPS, GLS, ILS for both on-board and off board equipment required for the aircraft's navigation performance or the distance to the runway threshold or other reference threshold. Yet other approach-relevant information may be provided by documents such as Jeppesen approach charts, Airplane Flight Manuals (AFM), or Flight Crew Operations Manuals (FCOMS), some of which may also be provided by suitably equipped Electronic Flight Bags (EFB) 36.

In addition, an ADDS Control Input Device 34 is provided to enter, accept, and utilize approach-relevant information that is available from, without limitation, a communications uplink from Air Traffic Control (ATC) or an Airline Operational Center (AOC), a paper chart, customized airline-specific approach procedure database, or other on-board aircraft systems such as the Aircraft Control System 26, the Flight Management System 28, or the Navigation System 32. The ADDS Control Input Device 34 may also be utilized to manage the display of information provided by the ADDS 24. For example, the device 34 may be used to command the ADDS 24 to pop-up ADDS graphical information as soon as the aircraft enters the approach phase of the flight. It may also be used to add or remove certain data tags associated with the graphical elements displayed on the ADDS 24.

Lastly, the ADDS Control Input Device 34 may be embodied as a dedicated control panel or as part of another control input device on the airplane. For example, and without limitation, the device 34 may be integrated as part of the Multi-function Control Display Unit (MCDU), or as part of another control panel for controlling flight management, navigation or display aspects of the aircraft's systems. Further, the device 34 may include, without limitation, voice command input means, keyboards, cursor control devices, touch-screen input and line select keys (LSK) or other keys on an MCDU.

While the components of the systems such as those depicted in FIG. 1 can be designed to interact with each other in a variety of ways, they must in the end be helpful to the pilot in providing operationally-relevant information for final approach and landing. The display of such information must be configured to dynamically adjust to landing capability degradation and provide updated information such as an updated decision height, an updated landing capability, and an updated minimum visual range to the pilots.

Figure 3:
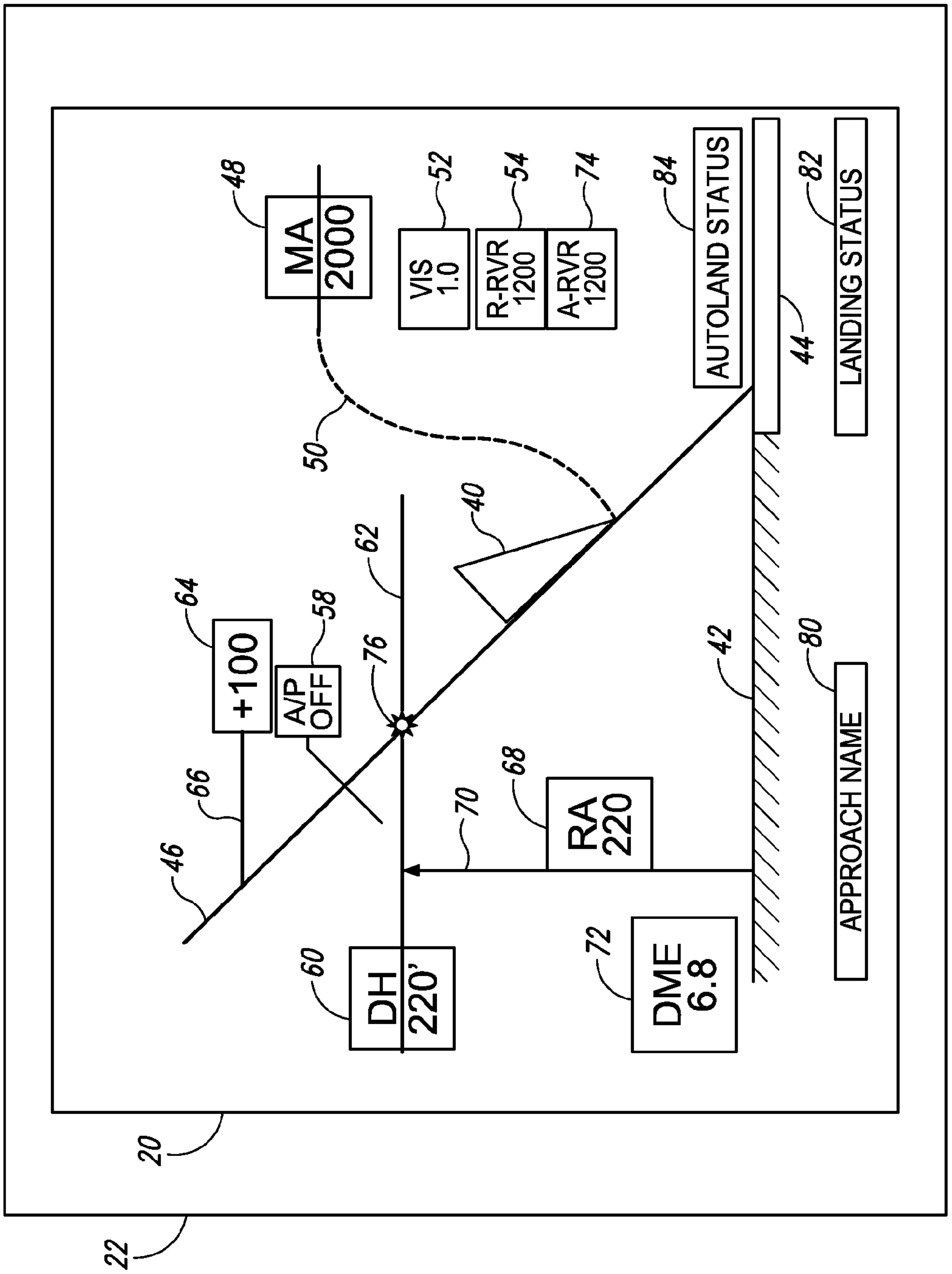
FIG. 3 is a diagram illustrating the various types of information available on an ADDS display.

FIG. 3, drawn not to scale for illustrative purposes, depicts the various types of operationally-relevant information available from the ADDS 24. FIG. 3 shows a graphical display 22 that includes an ADDS graphical display 20. Here, it may be helpful to break down the number of display elements by category. It should be appreciated that the display elements described below may be further coded by color, shape, attributes or other visual indicators and potentially, accompanied by aural tones or annunciations depending on the critical nature of the information. Furthermore, the data values presented in the figures, which may be slightly modified versions of available approach procedures, are provided by the way of example only and should not be construed as limiting. Lastly, any combination of graphical elements provided in this disclosure may be available for display; the combinations provided in figures are provided by the way of example and not limitation.

The first type of element is called a static or quasi-static referent. Static or quasi-static referents (hereafter called quasi-static for readability purposes) are elements that provide a reference that will help give meaning to other types of display elements. These referents are labeled quasi-static because they generally do not change state during the approach. Quasi-static referents include a ground-level indicator 42 graphically depicting the ground; a runway indicator 44 graphically depicting the runway; Touchdown Zone Elevation 78 (shown in FIG. 5 for an RNAV approach); an Approach Path indicator 46 graphically depicting the approach path such as a glide slope; a Missed Approach (MA) altitude tag 48 indicating the altitude to which the aircraft must initially climb if it cannot land; and a Missed Approach (MA) path indicator 50 graphically representing a missed approach path; Required Visibility tag 52 indicating the minimum required visibility, typically in statute miles, for generally a CAT I or non-precision approach; Required Runway Visual Range (R-RVR) 54 indicating the required RVR, typically in feet, for generally a CAT II, CAT III or other categories of approach that require RVR; Thrust Retard Capability 56 indicator (shown in FIGS. 5 and 6) indicating the airplane is capable of automatically pulling back the thrust for flare and landing even though autoland capability is not available; and the Autopilot Disconnect Cue 58 indicating the altitude at which the autopilot must be disconnected and the pilot takes over and manually flies the aircraft.

Although the Autopilot Disconnect Cue 58 is categorized as a quasi-static referent, depending on the approach type and autopilot system state, the altitude at which it is displayed may vary. However, if the autopilot system state doesn't degrade during the approach, the Autopilot Disconnect Cue 58 does not change during the approach either.

A second category of display elements in FIG. 3 are dynamic referents. Dynamic referents are referents that can change state during the approach. Dynamic referents include the airplane own-ship symbol 40 graphically depicting the airplane which may be updated along the Approach Path indicator 46 that graphically depicts the approach path as the airplane proceeds on the approach. Dynamic referents also include the Approach Minima tag 60 that shows the approved minimum altitude at which point the critical decision must be made, and the Approach Minima indicator 62 that graphically depicts the height above the ground. Dynamic referents further include the Approach Minima Alert tag 64 which indicates that the aircraft has descended to a certain height above the Approach Minimum 60 and the Approach Minima Alert indicator 66 that graphically depicts the approach minimum alert altitude; Radio Altitude (RA) tag 68 that shows the radio altitude value of the approach minimum and the Radio Altitude (RA) indicator 70 which graphically depicts the radio altitude; the Approach-Reference Distance 72 that indicates the horizontal distance to a reference such as a navigation station, geographic reference point, or the runway threshold; the Actual Runway Visual Range (A-RVR) 74 that is reported to the flight crew from the ground RVR equipment at the airport; and the Missed Approach Point (MAP) 76.

Lastly, a third category of display elements in FIG. 3 are status referents. Status referents are referents that indicate certain identifiers and the state of those identifiers. Status referents include the Approach Name 80, which also signifies the approach type such as ILS Category II and ILS Category IIIB. Status referents also include the Landing Clearance Status tag 82 indicating whether or not the aircraft has been cleared to land and the Autoland Status 84 indicating the capability of the autopilot system for landing the aircraft.

Those of ordinary skill in the art will appreciate that FIG. 3 depicts one preferred configuration of many that can be implemented to embody a graphical depiction of approach-relevant information. Enhancements of the graphical depiction such as rearrangement of the elements or addition of colors and symbols are within the scope of this invention. Additionally, those of ordinary skill in the art will also appreciate that the information supporting the graphical depiction in FIG. 3 comes from various sources on board the aircraft. By the way of example, and without limitation, the Landing Clearance Status tag 82 may come from an uplink from Air Traffic Control via the Communications System 30, optionally routed via the Flight Management System 28. The Approach-Reference Distance 72 may come via the Navigation System 32, optionally routed via the Flight Management System 28. In yet another example, the Approach Minima Alert tag 64 value may come from crew-entered data from an approach chart, from an EFB 36, or optionally a database within the Flight Management System 28 that may be customized for the airline.

As shown in FIG. 3, the ADDS 24 collects, transforms, and displays quasi-static, dynamic, and status referents that comprise all approach-relevant information available from the various sources shown in FIG. 1 into a well-integrated, operationally-relevant graphical display. Because of the way the quasi-static, dynamic, and status referents have been integrated, changes in the airplane's landing performance capability can concisely and clearly be reflected by changes in one or more of the dynamic or status referents. Thus pilots can look to one display, the ADDS 24, and gain a very clear picture of the operationally-relevant and decision-critical information without having to look up system health information and decode what the system health information means in terms of making critical approach and landing decisions.

For example, while on final approach, if the Autoland Status Annunciator (not shown) changes its annunciation from LAND 3, signifying all three autopilots are engaged and operating normally, to LAND 2, signifying that redundancy is reduced and only two autopilots may be available, or to NO AUTOLAND, signifying the pilot must take over and may have to go around, the ADDS 24 will display such status on the Autoland Status 84 indicator. Moreover, depending on when the system degradation occurs, an Autopilot Disconnect Cue 58 (shown offset for illustrative purposes) indicating the altitude at which the autopilot should be disconnected will be displayed. Furthermore, color may be used to indicate a non-normal condition and to alert the crew that important approach parameters have changed. Thus pilots will see graphically the operational effects of the landing performance capability degradation in one place without having to interpret previously available status annunciation.

In this regard, the ADDS 24 can significantly simplify the status information displayed to the pilot. For example, if the Autoland Status Annunciator annunciates LAND 3 or LAND 2, the pilot has to interpret what that means in terms of autoland capability, changes to approach minima, or other significant parameters. The ADDS 24, on the other hand, can simply annunciate AUTOLAND or NO AUTOLAND without codifying the autoland capability that a pilot must subsequently interpret and apply.

In addition to updating operationally-relevant status referents as a function of system health, the ADDS 24 also updates the relevant dynamic referents. For example, systems degradation such as ones affecting the autoland capability of an airplane may also affect the applicability of the selected approach procedure. If, for example, a CAT IIIB ILS approach to Runway 16L was being executed and the autoland system degrades from LAND 3 to LAND 2, the pilots may have to change the approach procedure to CAT II ILS approach to the same runway with higher approach minima. With the ADDS 24, the system degradation impact to the approach procedure and decision-critical parameters will be displayed graphically, thus eliminating the need to look up or recall alternate parameters or update flight plans for such a critical phase of flight. In the example above where the capability degrades, the Approach Minima tag 60 may be updated to show an increase in decision height from zero (0) ft. to 125 ft. and the RVR 74 will be updated from 300 ft. to not less than 984 ft.

Yet another benefit of the ADDS 24 is the interactive input capability via a control input device 34. The ADDS control input device 34 allows pilots to enter, select, or confirm certain parameters that are necessary for the decision-critical information displayed on the ADDS display 20. For example, and without limitation, the pilots may enter, confirm, or select (1) the equipment capability on board the aircraft accounting, for example, for previously known degradations; (2) the Approach Name 80 of the approach procedure to be engaged, and, potentially, alternate approach procedures; (3) Approach Minima 60 for their chosen approach consistent with regulations and their airline's policies; (4) Missed Approach (MA) 48 altitude; and the Autopilot Disconnect Due 58 altitude if an autoland approach will not be executed.

The interactive input capability enables cockpit flight crew to work on approach planning earlier in the flight, before the approach is commenced. By the way of example, and without limitation, the ADDS 24 and the control input device 34 can be engaged to select an approach; select a backup approach such as an approach to a parallel runway; select a secondary approach such as an approach that is more suitable in the event of an onboard or off-board equipment failure that degrades the autoland capability of the aircraft; and to get familiarized or visualize the approach en route or at any suitable phase of flight prior to entering the final approach phase of flight.

Figure 4:
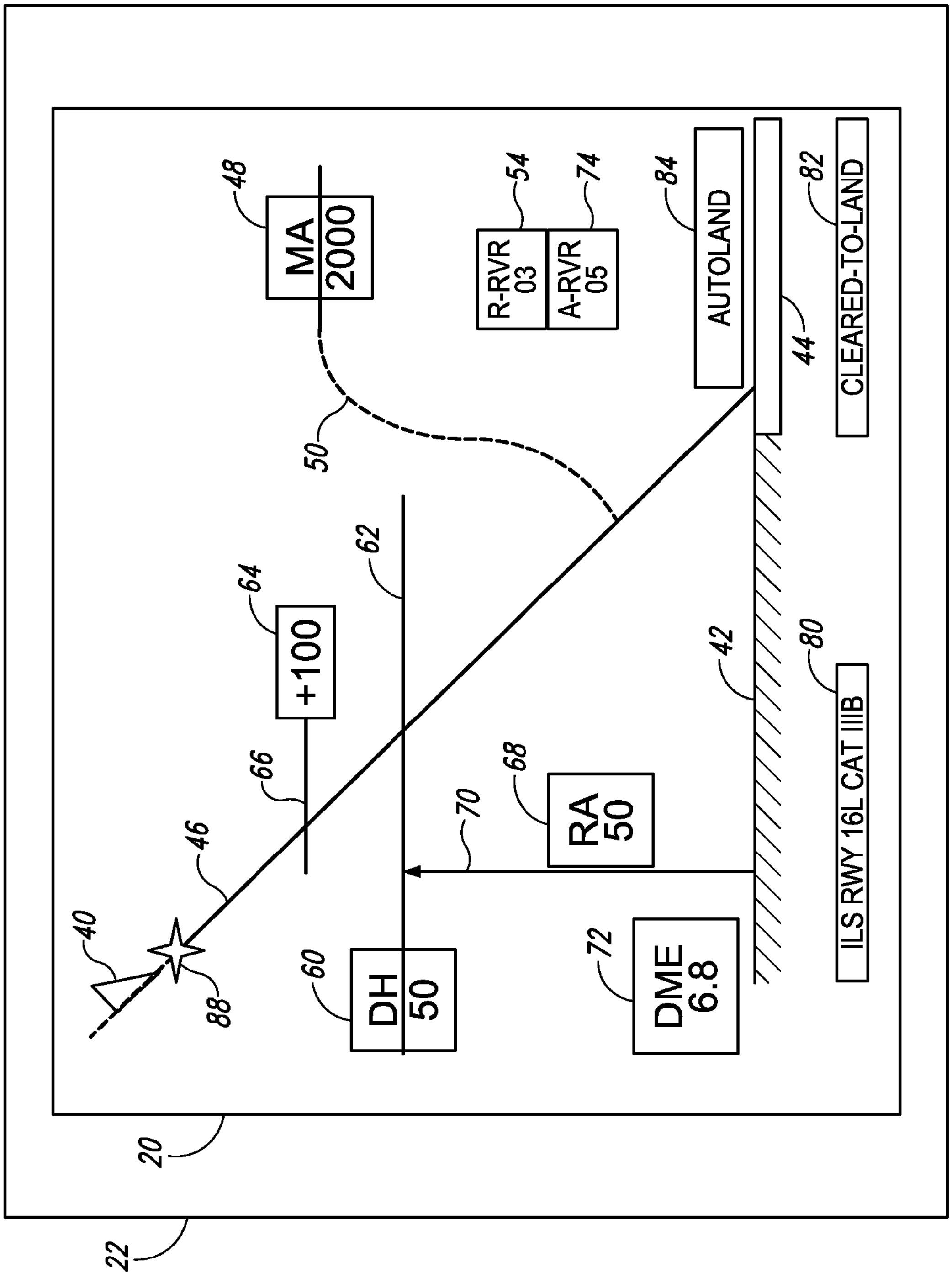
FIG. 4 is a diagram illustrating the use of an ADDS in an ILS CAT IIIB approach.

FIG. 4, drawn not to scale for illustrative purposes, provides an example of how an ADDS 24 is used. As depicted in FIG. 4, an own-ship symbol 40 is right before the waypoint 88 at which the approach phase of the flight starts. The Approach Name 80, ILS RWY 16L CAT IIIB, is displayed. A Required RVR of 300 ft. is displayed in the R-RVR 54 tag and an Actual RVR of 500 ft. is displayed in the A-RVR 74 tag signifying that the visibility requirement for the approach procedure is met. A Missed Approach (MA) altitude of 2000 ft. is displayed in the MA tag 48.

A Decision Height (DH) of 50 ft. is displayed in the Approach Minima tag 64. Ordinarily, a CAT IIIB approach will have a DH of 0 ft. Here, a DH of 50 ft. is displayed due to, for example, an airline specific procedure requirement that implements a higher decision height than is required. Furthermore, the Approach Minima Alert indicator 66 and the Approach Minima Alert 68 tag may optionally pop up when the aircraft reaches+100 ft. above the DH of 50 ft., thus giving the flight crew advanced notice of when they are about to reach the DH. Again, the approach minima alert may be programmed to be an airline specific or customized value.

Additionally, the RA tag 68 and its value of 50 ft. signifies that the Approach Minimum is measured in radio altitude for the selected approach. The aircraft is 6.8 nm from the DME station at the airport from which the Approach-Reference Distance is measured; this is reflected in the Approach-Reference Distance tag 72. ATC has cleared the aircraft to land as is indicated by the "CLEARED-TO-LAND" value in the Landing Clearance Status tag 82.

Lastly, all systems required for a CAT IIIB autoland are operational as is indicated by the "AUTOLAND" value in the Autoland Status tag 84. In contrast to prior annunciations such as LAND 3 or LAND 2 that pilots have to analyze to understand the effect on landing performance capability, the ADDS 24 simply annunciates AUTOLAND, displays all the operationally-relevant parameters supporting the critical decision, and thus provides a complete and more simplified depiction of the approach decision scenario. The pilots can use the ADDS 24 depiction of FIG. 4 all the way to touchdown provided there are no system degradations that change the values of the displayed parameters.

Figure 5:
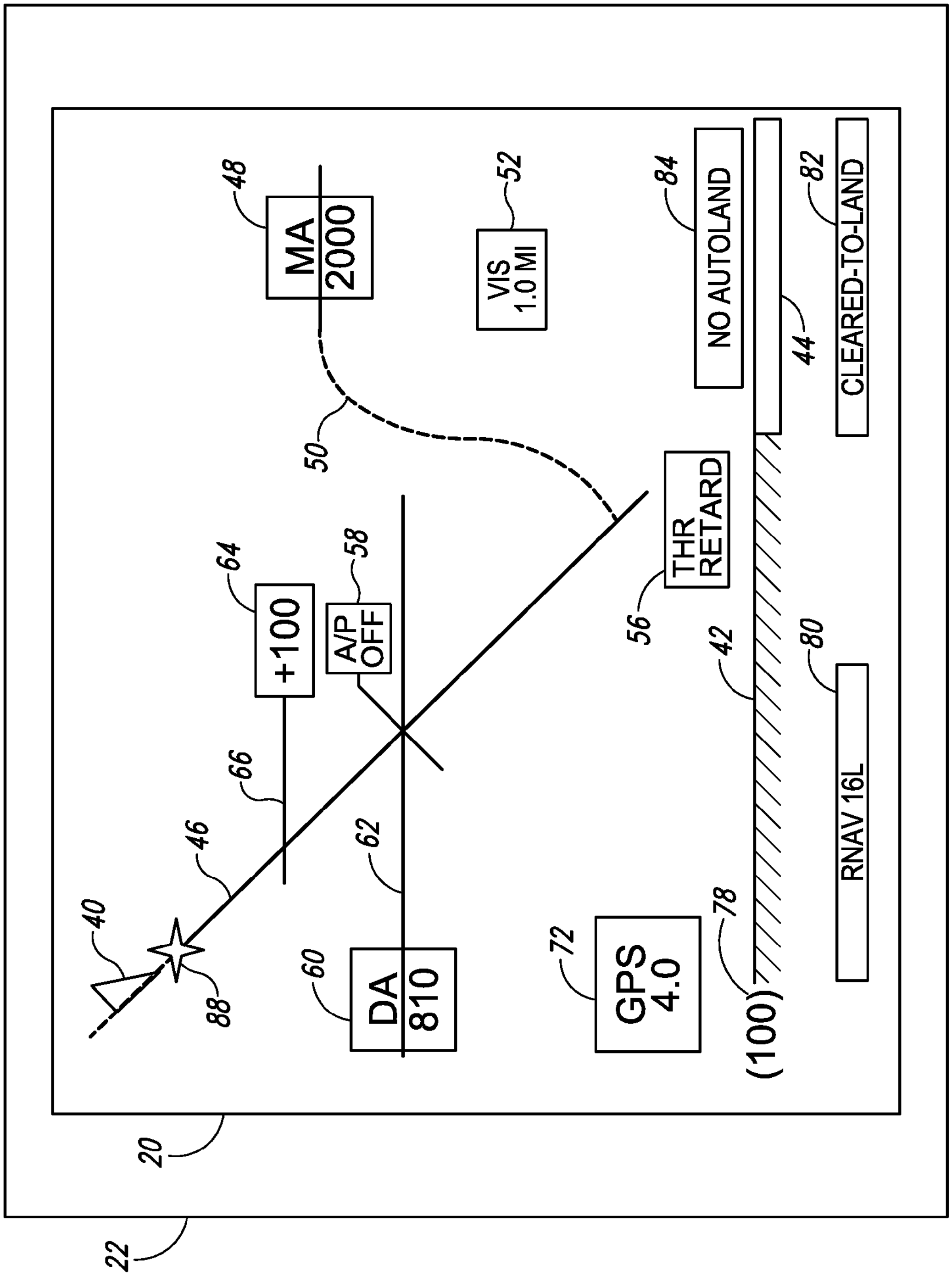
FIG. 5 is a diagram illustrating the use of an ADDS in an RNAV approach.

FIG. 5, drawn not to scale for illustrative purposes, depicts another example of how an ADDS 24 is used with a different approach procedure such as an RNAV approach procedure. As depicted in FIG. 5, an own-ship symbol 40 is right before the waypoint at which the approach phase of the flight starts. The approach name 80, RNAV RWY 16L, is displayed. ATC has cleared the aircraft to land as is indicated by the "CLEARED-TO-LAND" value in the Landing Clearance Status tag 82. A Flight Visibility requirement of one mile is displayed in the Required Visibility tag 52. A Missed Approach (MA) altitude of 2000 ft. is displayed in the MA tag 48.

A Decision Altitude (DA) of 810 ft. is displayed in the Approach Minima tag 60 and the Touchdown Zone Elevation tag 78 shows a value of 100 ft. Furthermore, the Approach Minima Alert indicator 66 and the Approach Minima Alert 68 tag may optionally pop up when the aircraft reaches +100 ft. above the DA of 810 ft., thus giving the flight crew advanced notice of when they are about to reach the DA. Again, the approach minima alert may be programmed to be an airline specific or customized value. The Autopilot Disconnect Cue 58 is also displayed at the intersection of the Approach Minima indicator 62 and the Approach Path Indicator 46 indicating the point at which the autopilot is disconnected and manual flying begins. The Thrust Retard Capability 58 indicator for flare and landing is displayed where the Approach Path Indicator 46 ends to indicate to the pilot that thrust retard capability is available. Lastly, since the RNAV approach type is not autoland-capable, the NO AUTOLAND indicator is displayed as the value of the Autoland Status 84 indicator to remind the pilot that a manually-controlled landing is required.

Additionally, the RA tag 68 and RA Indicator 70 are no longer displayed as the approach minimum for this procedure, namely the Decision Altitude (DA), is based on barometric altitude and not radio altitude. However, optionally, the height above the Touchdown Zone Elevation, here 711 ft., may be graphically displayed by a vertical line and a data tag much like the RA Tag 68 and RA Indicator 70 are shown in FIG. 4. Also, as this is an RNAV procedure, the Approach-Reference Distance is measured in feet from the runway threshold. Here, the aircraft is 4.0 nm from the runway threshold as is reflected in the Approach-Reference Distance tag 72.

It is important to note that one of the salient features of the ADDS' 24 advantage is that the graphical scenario depicted is substantially independent of the systems and equipment required for the landing performance capability for that particular approach. As shown above, FIGS. 4 and 5 look substantially similar even though FIG. 4 depicts an ILS-based approach and FIG. 5 depicts an RNAV-based approach where the guidance sources are ILS radio receivers and Flight Management Systems (FMS) 28 respectively. Thus, one device, the ADDS 24, can be used for a variety of approaches such as ILS and RNAV—and potentially GLS (GPS Landing system), MLS (Microwave Landing System), or others—using substantially the same graphical depiction. No matter what approach procedure is utilized, the presentation to the pilot remains substantially similar resulting in a familiarity that simplifies the approach decision task.

Thus, with an ADDS 24, once a pilot chooses and starts to execute an approach procedure, the pilot does not have to keep track of the type of systems and the health of the systems in order to obtain operationally-relevant information to make the critical decision involving (1) whether or not continue the landing and, if so, (2) whether to take over and hand-fly to touchdown or to continue an automatic landing. All the information needed to make the critical decision, including approach minima, visibility, and the AUTOLAND or NO AUTOLAND annunciation, are all displayed and dynamically updated on the ADDS display 20.

FIGS. 4 and 5 depict approach procedures, ILS-based and RNAV-based, that are different. For example, the former utilized on-ground and onboard ILS equipment while the latter used Flight Management System (FMS) guidance. While the former can use the autopilot system all the way to touchdown, the latter can use the approach procedure to a significantly higher decision altitude where the pilot resumes manual flying. The ADDS 24, through its control input device 34, can be programmed to store, for example, a primary approach procedure such as ILS RWY 16L CAT IIIB and a secondary (back-up) procedure such as RNAV RWY 16L in the Flight Management System (FMS) 28 or other suitable equipment. When the pilots are planning or preparing for the approach phase of their flight, they can choose, via the control input device 34, the Flight Management System (FMS), 28 or other suitable device, the particular procedure they wish to engage. For example, if while on route, they learn that the ILS ground equipment on RWY 16L is inoperative, they can select the backup procedure, namely RNAV RWY 16L, as the primary procedure and complete their approach planning. In this manner, by enabling advance handling of known equipment failures, the ADDS 24 can be used for better approach planning and workload reduction.

Figure 6:
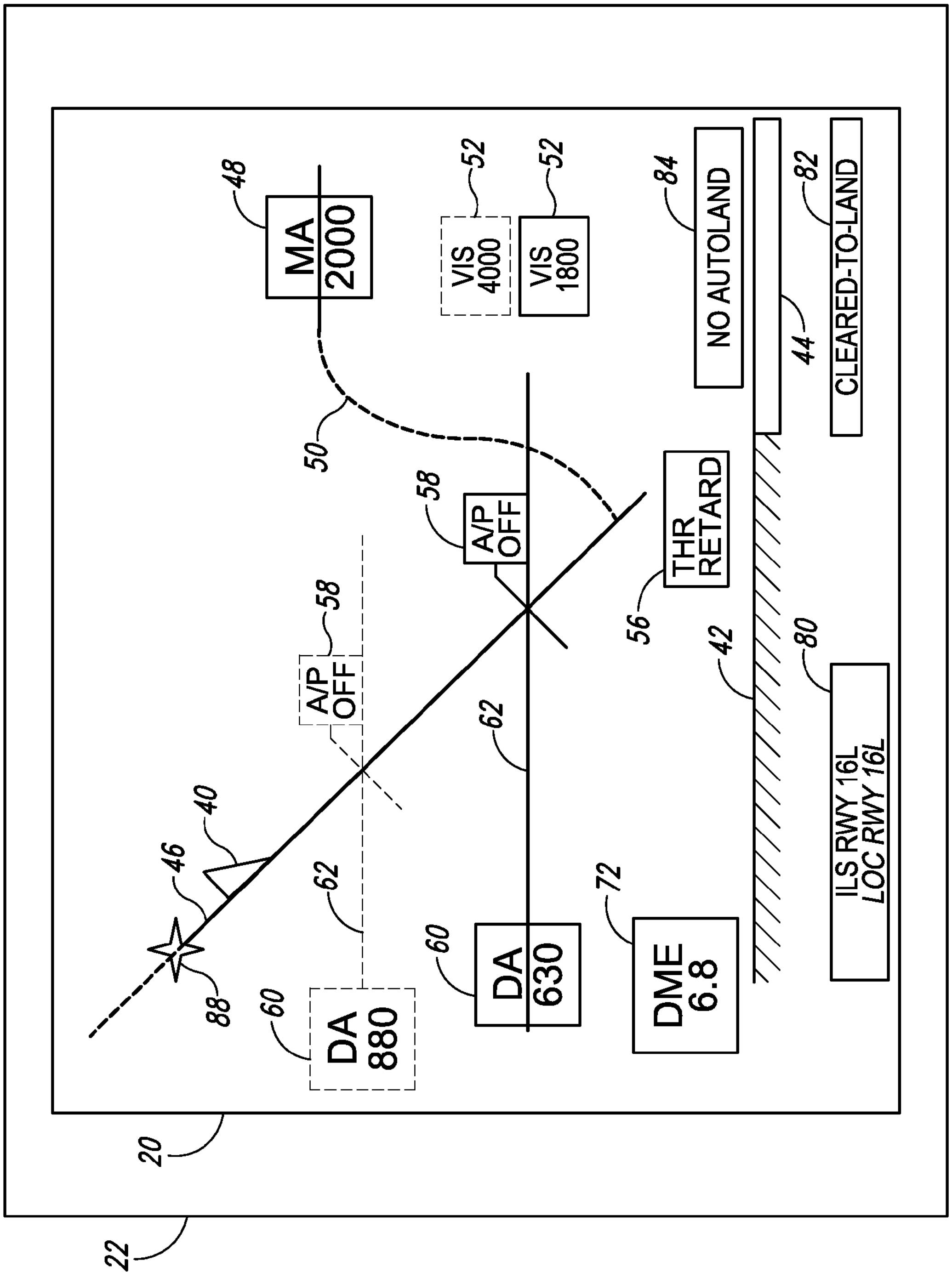
FIG. 6 is a diagram illustrating the use of an ADDS during a landing performance degradation.

Lastly, FIG. 6, also not drawn to scale for illustrative purposes, provides yet another example of how an ADDS 24 is used. In this depiction, the aircraft is executing approach procedure for ILS RWY 16L (Cat I) when the glide slope fails. The ADDS 24 activates a secondary approach, namely LOC RWY 16L, updates the dynamic referents such as the decision altitude and flight visibility, and provides the pilots a clear and simple alternative, thus avoiding having to look and find an alternative approach, as well as potentially executing a missed approach.

As depicted in FIG. 6, an own-ship symbol 40 is shown after the waypoint 88 indicating that the airplane has entered the approach phase. The primary approach procedure and related parameters are shown in solid lines, and the alternate (back-up) approach procedure is shown in dashed lines and italics (Note: the dashed lines and italics are utilized here for illustrative purposes only). Here, it is important to note that the alternate (back-up) approach procedure and related parameters are only displayed on command by the pilot or when the primary approach is no longer feasible.

The expanded description below refers to a scenario when the secondary approach is activated due to a glide slope failure. Before the glide slope failure, the primary Approach Name 80, ILS RWY 16L, is displayed. ATC has cleared the aircraft to land as is indicated by the "CLEARED-TO-LAND" value in the Landing Clearance Status tag 82. A Flight Visibility requirement of 1800 ft. is displayed in the Required Visibility tag 52. A Missed Approach (MA) altitude of 2000 ft. is displayed in the MA tag 48.

A Decision Altitude (DA) of 630 ft. is displayed in the Approach Minima tag 60. Furthermore, the Approach Minima Alert indicator 66 and the Approach Minima Alert 68 tag may optionally pop up or indicate, including by color or symbol change, when the aircraft reaches +100 ft. above the DA of 630 ft., thus giving the flight crew advanced notice of when they are about to reach the DA. Again, the approach minima alert may be programmed to be an airline specific or customized value. Here, the Approach Minima Alert indicator 66 and tag 68 are not displayed as the aircraft is significantly higher than the 100 ft. threshold.

The Autopilot Disconnect Cue 58 is also displayed at the intersection of the Approach Minima indicator 62 and the Approach Path Indicator 46 indicating the point at which the autopilot is disconnected and manual flying begins. Lastly, the Thrust Retard Capability 58 indicator for flare and landing is displayed where the Approach Path Indicator 46 ends to indicate to the pilot that thrust retard capability is available.

When the glide slope fails, the Decision Altitude (DA) moves up from 630 ft. to 880 ft. as reflected by the dashed Approach Minima 60 tag and associated Approach Minima Indicator 62 line. The Flight Visibility requirement is also increased from 1800 ft. to 4000 ft. as reflected by the dashed Required Visibility 52 tag. The approach procedure is also updated from ILS RWY 16L to LOC RWY 16L (here in italics for illustrative purposes) in the Approach Name 80 tag indicating that an alternate approach procedure should be used.

Thus, when the glide slope failure occurs, all of the operationally-relevant information for the alternate procedure pop up and the pilots simply execute the alternate approach. The pilots no longer have to think through the effects of the systems failures or degradations and determine what that means in terms of the current approach. The ADDS 24 activates the alternate approach and updates the operationally relevant information. In this case, since the aircraft is above the updated decision altitude of 880 ft., the pilots can continue the approach until an altitude of 880 ft. and disconnect the autopilot at 880 ft. If the pilot has a visibility of 4000 ft. at that point, the pilot can continue the approach manually; if not, the pilot executes a missed approach.

The capability to activate the secondary (back-up) approach as in FIG. 6 does not necessarily have to be available in failure modes only. It may optionally be made available to pilots so that they can visually review the operationally-relevant parameters for primary and secondary approach procedures while they are planning the approach. The graphical depiction may be made one at a time such as first displaying the primary procedure and then displaying the secondary procedure, or it may be displayed as a superposition of the relevant depiction such as in FIG. 6 so that the pilots can get a relative sense of the impact of changing approach procedures.

Figure 7:
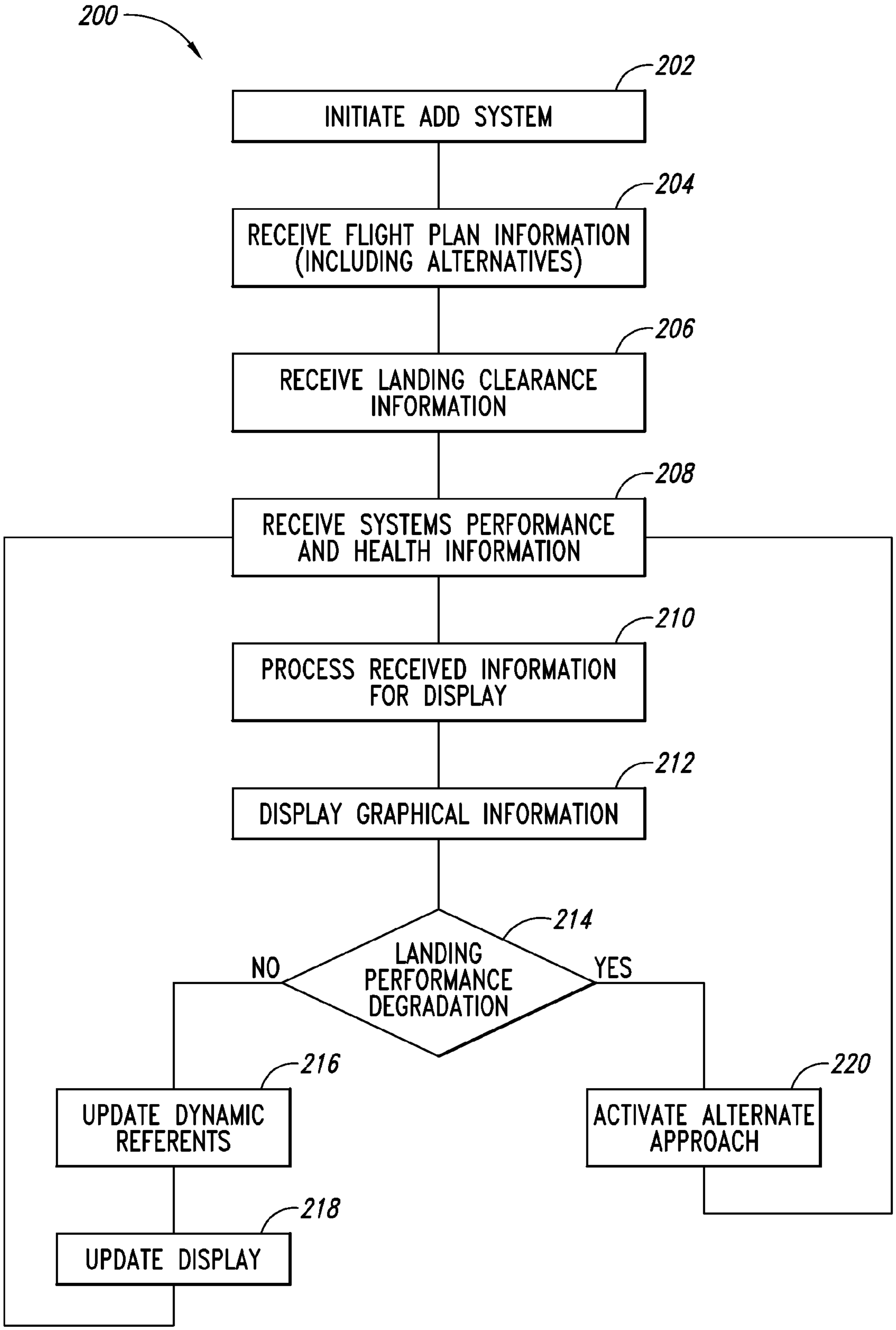
FIG. 7 is a flow chart illustrating an exemplary method for generating an approach decision display.

FIG. 7 depicts a general method 200 by which the disclosure may be implemented. The display of graphical information on display systems such as those utilized by pilots in a modern aircraft display system, including the storage and retrieval of certain information such as approach procedures in support of flight displays, have been previously implemented in industry. Those skilled in the art would understand how the placement of display symbology as well as storage and retrieval of approach procedures would be accomplished on aircraft systems, and that the depiction herein is one of several possible methods of displaying symbology.

It should be appreciated that the logical operations described herein are implemented (1) as a sequence of computer implemented acts or program modules running on a computing system such as a Flight Management Computer (FMC) and/or (2) as interconnected machine logic circuits or circuit modules within the computing system. The implementation is a matter of choice dependent on the performance and other requirements of the computing system. Accordingly, the logical operations described herein are referred to variously as steps, operations, or acts. These states, operations, or acts, may be implemented in software, in firmware, in special purpose digital logic, and any combination thereof. It should also be appreciated that more or fewer operations may be performed than shown in the figures and described herein. These operations may also be performed in a different order than those described herein.

First, a pilot initiates the ADDS system 202. Alternatively, an on-board computer may automatically initiate the ADDS system 202 as a function of phase of flight or other suitable context-sensitive criterion. This initiation step may range from simply turning on the system; choosing the ADDS 24 from a plurality of available display applications; making or confirming a plurality of selections via a control input device 34; or providing the ADDS 24 additional information from another system such as the navigation system 32 or the communication system 30.

Next, the ADDS 24 receives a number of approach-relevant data elements wherein the order of reception is not critical. The ADDS 24 receives flight plan information 204 such as a list of potential approach procedures including primary and secondary approach procedures from the Flight Management System (FMS) 28, its Navigation Database (NDB), or another suitable system. Furthermore, the ADDS 24 receives clearance to land status 206 from the Communication System 30 or another suitable system, or from pilot input.

In Step 208, the ADDS 24 receives information related to system performance parameters such as current barometric altitude, current radio altitude, heading, etc., as well as system health information such as whether the reporting system is operational, failed, or in the OFF mode. Such information is typically provided via digital databus from each onboard system providing input to the ADDS 24. This is done today on many types of modern jet aircraft such as the Boeing 777 and the person skilled in the art would understand how such reporting is implemented.

In Step 210, the ADDS 24 processes the received information display and displays the information in graphical format in Step 212, in a manner substantially similar to what is displayed in FIGS. 3-6. In Steps 214, the method monitors for any degradation in landing performance capability as reported by the systems' performance and health information Step 208. If the landing performance capability for the primary (active) approach is not affected, the method updates the dynamic referents in Step 216 and updates the display in Step 218. The method then loops back to Step 208 and continues to receive, process, and display the most current information on the ADDS display 20.

In Step 214, if the method finds that the landing performance capability is degraded, the method activates an alternative approach in Step 220 from a plurality of stored approaches. Once activated, the method loops back to Step 208 and receives, processes, and displays the most current information that is relevant for the now primary approach on the ADDS display 20.

It is important to note that aspects of the method can be made to be context-sensitive. For example, the ADDS display 20 can be displayed en route, prior to entering the final approach phase for flight crew to plan and confirm the selected approach. It can be used in a preview planning mode as well as the active mode such as when the airplane is on final approach. For example, in the preview planning mode, a subset of the steps, such as Step 202-212, can be utilized whereas in the active mode all steps, Steps 202-220, may be utilized.

The method can also be engaged to cause the ADDS display 20 to activate in pop-up mode such as when a new approach is selected or when the airplane enters or is about to enter the final approach phase. The sensitivity, which can be in terms of time, distance, or other parameter of interest, can depend on a number of suitable factors that correlate with any number of critical task performance benefits such as improved situational awareness, reduction in the number of unnecessary missed approaches, and improper landings when the parameters change and the pilots continue with the landing.

The subject matter described above is provided by the way of illustration only and should not be construed as limiting. While preferred embodiments have been described above and depicted in the drawings, other depictions of data tags and graphics symbology can be utilized in various embodiments of the disclosure. Graphical symbology may be used in place of text-based indications. Measurement units such as feet, meters, or miles may be suitably changed as appropriate for the task, custom, or convention. Lastly, the nomenclature, color, and geometric shape of the display elements can be varied without departing from the scope of the disclosure as defined by the appended claims.

I claim:

1. A final approach decision display device, the device indicating dynamic decision parameters corresponding to a selected approach and an airplane's ability to execute the approach and landing, comprising:

quasi-static referents comprising at least one of a ground level indicator, a runway indicator, a touchdown zone elevation tag, an approach path indicator, a missed approach altitude tag, a required visibility tag, a runway visual range tag, a thrust retard capability indicator, and an autopilot disconnect cue;

dynamic referents comprising at least one of an own-ship symbol, an approach minima tag, an approach minima indicator, an approach minima alert tag, an approach minima alert indicator, a radio altitude tag, a radio altitude indicator, an approach-reference distance tag, an actual runway visual range tag, and a missed approach point symbol; and status referents comprising at least one of an approach name, a landing clearance status tag, and an autoland status tag wherein the quasi-static, the dynamic, and the status referents are updated as a function of required equipment health for the selected approach and landing to graphically depict the airplane's landing performance capability.

2. A system for indicating dynamic decision parameters corresponding to a selected approach and an airplane's ability to execute the approach and landing, comprising:

an approach decision display system, the approach decision display system providing operationally-relevant information for final approach and landing;

a flight management system operatively connected to the approach decision display system;

a cockpit graphical display system operatively connected to the approach decision display system;

an aircraft control system operatively connected to the approach decision display system;

a communications system operatively connected to the approach decision display system a navigation system operatively connected to the approach decision display system; and a control input device operatively connected to the approach decision display system; and a graphical display of operationally-relevant information displayed on the cockpit graphical display system, wherein the operationally-relevant information comprises of a quasi-static referent, a dynamic referent, and a status referent, further wherein the quasi-static referent, the dynamic referent, and the status referent are updated as a function of required equipment health for the selected approach and landing to graphically depict the airplane's landing performance capability.

3. The system of claim 2 wherein the quasi-static referent comprises at least one of a ground level indicator, a runway indicator, a touchdown zone elevation tag, an approach path indicator, a missed approach altitude tag, a required visibility tag, a runway visual range tag, a thrust retard capability indicator, and an autopilot disconnect cue.

4. The system of claim 2 wherein the dynamic referent comprises at least one of an own-ship symbol, an approach minima tag, an approach minima indicator, an approach minima alert tag, an approach minima alert indicator, a radio altitude tag, a radio altitude indicator, an approach-reference distance tag, an actual runway visual range tag, and a missed approach point symbol.

5. The system of claim 4 wherein the approach-reference distance comprises at least one of distance to a navigation transmitting station, distance to runway threshold, and distance to a geographically relevant position.

6. The system of claim 2 wherein the status referent comprises at least one of an approach name, a landing clearance status tag, and an autoland status tag.

7. The system of claim 2 wherein the cockpit graphical display system comprises at least one of a Primary Flight Display (PFD), a Heads-up Display (HUD), a Navigation Display (ND), an Electronic Flight Bag (EFB) display, a Multi-Function Display (MFD), and an Approach Decision Display (ADDS).

8. The system of claim 2 wherein the control input device is at least one of a control panel, a keyboard, a cursor with a cursor control device, line select keys (LSK) on a control display unit, and a touchscreen, further wherein the control input device may be integrated into at least one of a Mode Control Panel (MCP), a Multifunction Control Display Unit (MCDU), an Electronic Flight Bag (EFB), and an Approach Decision Display System (ADDS) control panel.

9. The system of claim 2 wherein the navigation system comprises at least one of an Instrument Landing System (ILS) unit, a Distance Measuring Equipment (DME) unit, Global Positioning System (GPS) unit.

10. The system of claim 2 further comprising an Electronic Flight Bag (EFB) system.

11. A method of providing a tool for approach decision making on a cockpit display system, the tool providing operationally-relevant information corresponding to a selected approach and an airplane's ability to execute the approach and landing, comprising:

initiating an Approach Decision Display System (ADDS) system;

receiving flight plan information;

receiving landing clearance information;

receiving system performance and system health information;

processing received the flight plan, the landing clearance, the system performance, and the system health information for display;

displaying operationally-relevant information wherein the operationally-relevant information comprises of processed information from the flight plan, the landing clearance, the system performance, and the system health information;

monitoring for landing performance capability degradation;

updating dynamic referents continuously; and updating the display of the operationally-relevant information as a function of required equipment health for the selected approach and landing to graphically depict the airplane's landing performance capability.

12. The method of claim 11 wherein the flight plan information comprises at least one of en route phase of flight and approach phase of flight.

13. The method of claim 11 wherein receiving landing clearance information comprises at least one of receiving the landing clearance information from a communications datalink system or from a control input device.

14. The method of claim 11 wherein receiving system performance and system health information comprises of receiving system performance and system health information from at least one of an aircraft control system, a navigation system, a flight management system, a communications system, and an electronic flight bag system.

15. The method of claim 11 wherein processing received information comprises filtering, transforming, and arranging received information into a reduced set of operationally-relevant information for display on a plurality of Approach Decision Display System (ADDS) displays.

16. The method of claim 11 wherein processing received information further comprises transforming the received information for display on a plurality of Approach Decision Display System (ADDS) displays.

17. The method of claim 11 wherein the ADDS is initiated by an on-board computer as a function of phase of flight.

18. The method of claim 11 wherein initiating the ADDS comprises at least one of initiating the ADDS via a control input device and initiating the ADDS via a Flight Management System.

19. The method of claim 11 wherein monitoring landing performance degradation comprises of monitoring for performance and health of onboard and off-board systems and equipment needed for executing the final approach and landing for the selected approach.

20. The method of claim 19 further comprising activating an alternate approach plan from a plurality of approach plans.

21. A final approach decision display device, the device having dynamic decision parameters corresponding to a selected approach and an airplane's ability to execute the approach and landing, comprising:

a quasi-static referent, a dynamic referent, and a status referent wherein the quasi-static, the dynamic, and the status referents are automatically updated as a function of required equipment health for the selected approach and landing to graphically depict the airplane's landing performance capability.

22. The device of claim 21 wherein the quasi-static referent comprises at least one of a ground level indicator, a runway indicator, a touchdown zone elevation tag, an approach path indicator, a missed approach altitude tag, a required visibility tag, a runway visual range tag, a thrust retard capability indicator, and an autopilot disconnect cue.

23. The device of claim 21 wherein the dynamic referent comprises at least one of an own-ship symbol, an approach minima tag, an approach minima indicator, an approach minima alert tag, an approach minima alert indicator, a radio altitude tag, a radio altitude indicator, an approach-reference distance tag, an actual runway visual range tag, and a missed approach point symbol.

24. The device of claim 21 wherein the status referent comprises at least one of an approach name, a landing clearance status tag, and an autoland status tag.

25. A method of providing dynamic decision parameters corresponding to a selected approach and an airplane's ability to execute the approach and landing, comprising:

receiving approach-relevant information from other onboard systems;

processing for display a quasi-static referent, a dynamic referent, and a status referent based on the received approach-relevant information;

providing a graphical indication of the current landing performance capability of the airplane for the selected approach;

monitoring for a changed condition in the airplane's landing performance capability, the changed condition corresponding to a degradation of required equipment health for the selected approach and landing; and responsive to the changed condition, automatically updating the quasi-static referent, the dynamic referent, and the status referent as a function of required equipment health for the selected approach and landing to graphically depict the airplane's landing performance capability.

26. The method of claim 25 wherein the quasi-static referent comprises at least one of a ground level indicator, a runway indicator, a touchdown zone elevation tag, an approach path indicator, a missed approach altitude tag, a required visibility tag, a runway visual range tag, a thrust retard capability indicator, and an autopilot disconnect cue.

27. The method of claim 25 wherein the dynamic referent comprises at least one of an own-ship symbol, an approach minima tag, an approach minima indicator, an approach minima alert tag, an approach minima alert indicator, a radio altitude tag, a radio altitude indicator, an approach-reference distance tag, an actual runway visual range tag, and a missed approach point symbol.

28. The method of claim 25 wherein the status referent comprises at least one of an approach name, a landing clearance status tag, and an autoland status tag.

* * * * *